M. SKOLNIK.
CHILD'S VEHICLE.
APPLICATION FILED OCT. 18, 1919.
1,362,825.
Patented Dec. 21, 1920.
2 SHEETS—SHEET 1.
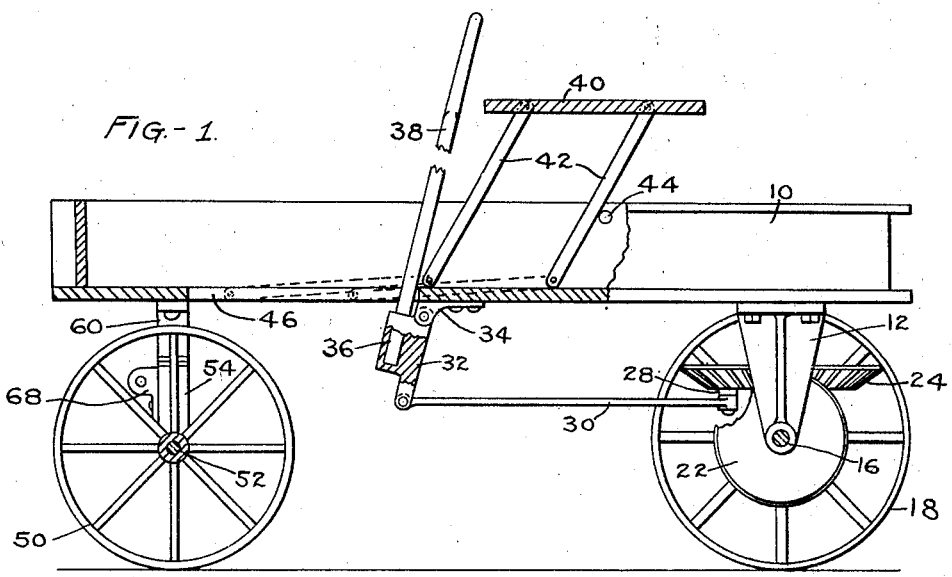
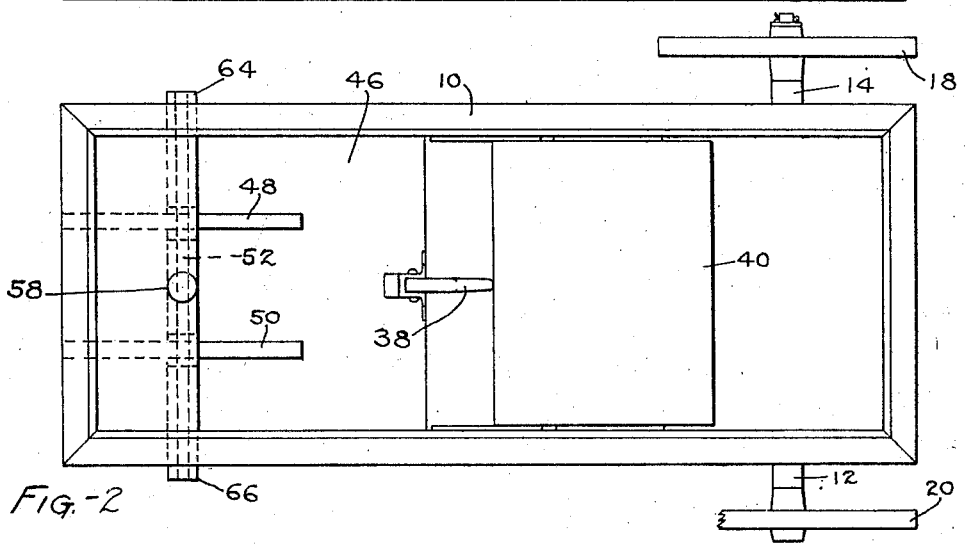
INVENTOR:
MAX SKOLNIK.
BY Whiteley
and Ruckman
ATTORNEYS.

M. SKOLNIK.
CHILD'S VEHICLE.
APPLICATION FILED OCT. 18, 1919.
1,362,825.
Patented Dec. 21, 1920.
2 SHEETS—SHEET 2.
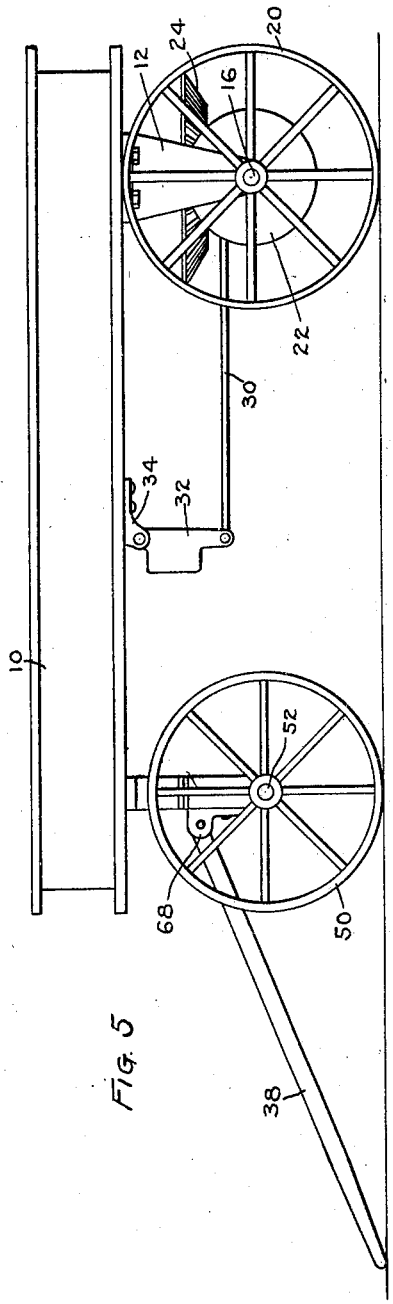
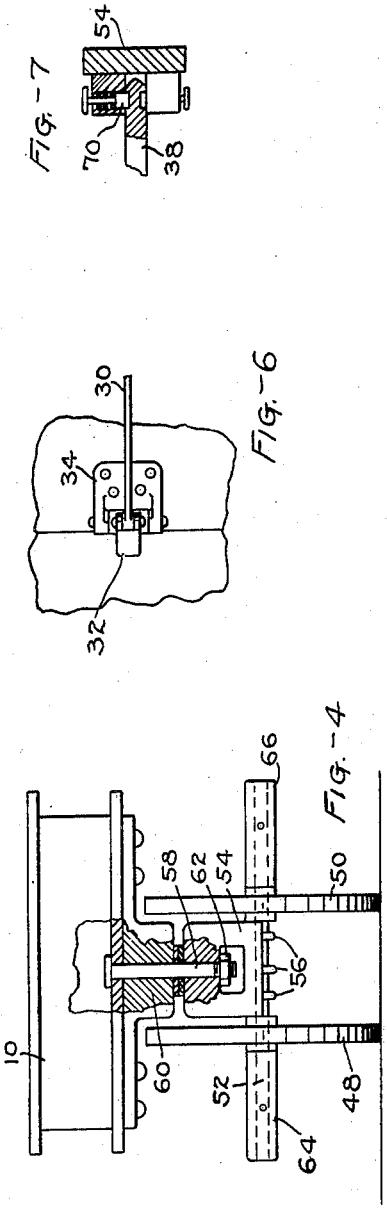
INVENTOR:
MAX SKOLNIK.
By Whiteley and Ruckman
ATTORNEYS.

UNITED STATES PATENT OFFICE.

MAX SKOLNIK, OF MINNEAPOLIS, MINNESOTA.

CHILD'S VEHICLE.

1,362,825.  Specification of Letters Patent.  Patented Dec. 21, 1920.

Application filed October 18, 1919. Serial No. 331,687.

*To all whom it may concern:*

Be it known that I, MAX SKOLNIK, a citizen of the United States, residing at Minneapolis, in the county of Hennepin and State of Minnesota, have invented certain new and useful Improvements in Children's Vehicles, of which the following is a specification.

My invention relates to a child's vehicle and an object is to provide a device of this character which may be propelled by the child when seated in the vehicle and which has a seat adapted to be swung down to constitute a portion of the bottom of the body of the vehicle so as to be out of the way when the child draws the vehicle by means of a handle member attached to the front. Other objects are to provide efficient means for propelling and steering the vehicle.

The full objects and advantages of my invention will appear in connection with the detailed description thereof and the novel features embodied in my inventive idea will be particularly pointed out in the claims.

In the accompanying drawings,—

Figure 1 is a view partly in side elevation and partly in longitudinal section showing the seat in its raised position. Fig. 2 is a top plan view. Fig. 3 is a rear elevational view. Fig. 4 is a front elevational view with the central portion shown in section. Fig. 5 is a side elevational view in which the seat has been swung down. Fig. 6 is a bottom plan view of a detail. Fig. 7 is a horizontal sectional view of a catch device.

Referring to the particular construction shown in the drawings, 10 designates a body member or box of the vehicle to the rear portion of which are secured depending brackets 12 and 14, the lower ends of which are provided with bearings to receive an axle 16. A rear wheel 20 is secured to one end of the axle and a rear wheel 18 is loosely mounted upon the other end of the axle. A bevel gear 22 secured to the axle meshes with a bevel gear 24 rotatably mounted upon a rod 26 depending from the rear portion of the box 10 and secured thereto in suitable manner. A crank pin 28 is secured to the lower face of the gear 24 and this pin extends through the rear end of a connecting rod 30 whose front end is pivoted to the lower end of a lever 32 having its upper end pivoted to a bracket 34 secured to the underside of the box 10. The lever 32 is provided with a socket 36 adapted to receive the lower end of a stick or handle member 38 for operating the driving connections leading to the rear shaft 16 for the purpose of propelling the vehicle. A seat 40 is pivotally attached to the upper ends of bars 42, the lower ends of which are pivoted to the sides of the box 10. Stops 44 within the sides of the box are engaged by bars 42 so that the seat is prevented from swinging back beyond its proper raised position. When the handle member 38 is removed from the socket 36 the seat may be swung down flatwise so as to constitute a portion of the bottom of the box 10 and cover an opening 46 in the front portion of the bottom. Front wheels 48 and 50 are rotatably mounted upon an axle or rod 52 and these wheels are much closer together than the rear wheels and are spaced from each other by a block 54 the lower end of which is secured to the rod 52 by staples 56. A king bolt 58 passes through a block 60 secured to the under side of the box 10 and this king bolt extends through the upper portion of the block 54 into an opening therein and is secured by a nut 62 whereby the front wheels are mounted so that they may turn for steering purposes. The front wheels are held upon the rod 52 by cylindrical blocks 64 and 66 secured to the outer portions of the rod, and these blocks constitute foot rests whereby the child may steer the vehicle when sitting on the seat 40 after the latter has been placed in its raised position. A bracket 68 is secured to the front of the block 54 and this bracket is provided with a catch device 70 adapted to receive one end of the handle member 38 when this member is removed from the socket 36. The end of the handle member may be suitably shaped for coöperation with the catch device.

The operation and advantages of my invention will be readily understood from the foregoing description. When the seat is in the raised position shown in Fig. 1 the child may sit thereon and by moving the handle member back and forth may propel the vehicle. By resting the feet upon the members 64 and 66 the vehicle is readily steered by pushing with one foot or the other according to the direction in which it is desired to steer the vehicle. When the child wishes to draw the vehicle as an ordinary wagon the handle member 38 is removed and attached as a tongue, as shown in Fig. 5, the catch 70 serving to detachably hold it in place. The seat is then swung forwardly and downwardly so as to cover the open space 46, and the entire portion of the box 10 may then be conveniently used for containing articles.

I claim:

1. A child's vehicle comprising a body member, an axle supported from the rear of said body member, wheels mounted on said axle, an operating member pivoted to said body member, driving connections between said operating member and said rear axle, said operating member being provided with a socket, means for supporting the front of the vehicle, an attaching member secured to the front of the vehicle, and a handle member adapted to be held by said attaching member for pulling the vehicle or to be inserted in said socket for use in propelling the vehicle.

2. A child's vehicle comprising a body member, an axle supported from the rear of said body member, wheels mounted on said axle, a lever pivoted to said body member, driving connections between said lever and said rear axle, said lever being provided with a socket, a front axle attached to said body member for swinging movement in a horizontal plane, guiding wheels mounted on said front axle, a catch device mounted on said axle for swinging movement therewith, and a handle member adapted to be held by said catch or to be inserted in said socket as desired.

3. A child's vehicle comprising a body member having a box-like portion, an axle supported from the rear of said body member, wheels mounted on said axle, an operating member pivoted to the under side of said body member, driving connections between said operating member and said rear axle, said operating member being provided with a socket, a handle member adapted to be inserted in said socket for use in propelling the vehicle, a seat pivoted to said body member, said seat being adapted to occupy a raised position at the rear of said handle member when in place, and to be swung forwardly to complete the box of the body member when said handle is removed, and means for supporting the front of the vehicle.

4. A child's vehicle comprising a body member having a box-like portion, an axle supported from the rear of said body member, wheels mounted on said axle, an operating member pivoted to the under side of said body member, driving connections between said operating member and said rear axle, said operating member being provided with a socket, a handle member adapted to be inserted in said socket for use in propelling the vehicle, a seat pivoted to said body member, said seat being adapted to occupy a raised position at the rear of said handle member when in place, and to be swung forwardly to complete the box of the body member when said handle is removed, a front axle attached to said body member for swinging movement in a horizontal plane, guiding wheels mounted on said front axle, and foot rests mounted on the outer portions of said front axle.

In testimony whereof I hereunto affix my signature.

MAX SKOLNIK.